United States Patent
Kusuda et al.

(10) Patent No.: US 9,522,327 B2
(45) Date of Patent: Dec. 20, 2016

(54) GAME SYSTEM

(75) Inventors: Kazuhiro Kusuda, Minato-ku (JP); Takashi Uchiyama, Minato-ku (JP); Shogo Azuma, Minato-ku (JP); Shinya Ito, Minato-ku (JP); Norifumi Kawai, Minato-ku (JP); Genichiro Okitani, Minato-ku (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 394 days.

(21) Appl. No.: 13/814,556

(22) PCT Filed: Aug. 30, 2011

(86) PCT No.: PCT/JP2011/069532
§ 371 (c)(1),
(2), (4) Date: Feb. 6, 2013

(87) PCT Pub. No.: WO2012/032963
PCT Pub. Date: Mar. 15, 2012

(65) Prior Publication Data
US 2013/0137515 A1 May 30, 2013

(30) Foreign Application Priority Data
Sep. 9, 2010 (JP) ................................. 2010-201782

(51) Int. Cl.
*A63F 9/24* (2006.01)
*A63F 13/31* (2014.01)
*A63F 13/87* (2014.01)

(52) U.S. Cl.
CPC .............. *A63F 13/31* (2014.09); *A63F 13/87* (2014.09); *A63F 2300/554* (2013.01);
(Continued)

(58) Field of Classification Search
CPC .............. A63F 13/12; A63F 2300/5573; A63F 2300/5533; A63F 2300/554; A63F 2300/5546; A63F 2300/5566; A63F 2300/572; A63F 2300/65; A63F 2300/8058; A63F 13/49; A63F 13/79; A63F 13/795; A63F 213/58; A63F 13/825
(Continued)

(56) References Cited

U.S. PATENT DOCUMENTS 6,760,751 B1 * 7/2004 Hachiya et al. ............... 709/206
8,316,399 B1 * 11/2012 Nush ................... H04N 21/4583
725/55
(Continued)

FOREIGN PATENT DOCUMENTS

CN 1191439 A 8/1998
CN 101794343 A 8/2010
(Continued)

OTHER PUBLICATIONS

Diablo II Manual. Blizzard Entertainment. 2000. Accessed via the Internet. Accessed Nov. 12, 2014. <URL: http://ftp.blizzard.com/pub/misc/Diablo%20II%20Manual.pdf>.*
(Continued)

*Primary Examiner* — Dmitry Suhol
*Assistant Examiner* — Carl V Larsen
(74) *Attorney, Agent, or Firm* — Sughrue Mion, PLLC

(57) ABSTRACT

A game system has plural game devices and a storage device that stores attribute information and location information of a pet in association with a player ID. Each game device obtains a player ID of a player who plays at the game device, and obtains attribute information corresponding to location information identifying a game device identified by the obtained player ID, and controls a game to cause the game device to display a pet according to the obtained attribute information. In a case in which location information stored in association with a player ID of a first player who plays at a first game device is changed to that which identifies a second game device identified by a player ID of a second player, the first game device does not display a pet of the first player, but the second game device displays the pet of the first player.

11 Claims, 6 Drawing Sheets

(52) U.S. Cl.
CPC .......... *A63F 2300/5546* (2013.01); *A63F 2300/5566* (2013.01); *A63F 2300/5573* (2013.01); *A63F 2300/572* (2013.01); *A63F 2300/65* (2013.01); *A63F 2300/8058* (2013.01)

(58) Field of Classification Search
USPC .......................................... 462/42
See application file for complete search history.

(56) References Cited

U.S. PATENT DOCUMENTS

| 8,814,704 | B2* | 8/2014 | Togashi | A63F 13/12 463/42 |
|---|---|---|---|---|
| 2003/0005062 | A1 | 1/2003 | Hachiya et al. | |
| 2004/0162136 | A1* | 8/2004 | Yamato et al. | 463/29 |
| 2006/0036700 | A1 | 2/2006 | Hachiya et al. | |
| 2006/0068917 | A1 | 3/2006 | Snoddy et al. | |
| 2007/0060353 | A1* | 3/2007 | Omori et al. | 463/39 |
| 2007/0111795 | A1* | 5/2007 | Choi et al. | 463/42 |
| 2007/0287478 | A1* | 12/2007 | Park | 455/466 |
| 2010/0188936 | A1* | 7/2010 | Beppu et al. | 368/10 |
| 2010/0192173 | A1* | 7/2010 | Mizuki et al. | 725/25 |
| 2010/0192176 | A1* | 7/2010 | Beppu et al. | 725/34 |
| 2011/0070935 | A1* | 3/2011 | Beggs | 463/1 |
| 2011/0098117 | A1 | 4/2011 | Tanaka | |

FOREIGN PATENT DOCUMENTS

| JP | 10-314454 A | 12/1998 |
|---|---|---|
| JP | 11-65965 A | 3/1999 |
| JP | 2002-210252 A | 7/2002 |
| JP | 2002-301268 A | 10/2002 |
| JP | 2003-126554 A | 5/2003 |
| JP | 3470108 B2 | 9/2003 |
| JP | 2009-39305 A | 2/2009 |
| JP | 2009-119049 A | 6/2009 |
| WO | 99/35597 | 7/1999 |

OTHER PUBLICATIONS

Japanese Office Action of JP Application No. 2010-201782, dated Nov. 22, 2011.
Communication dated Jun. 30, 2014 from the State Intellectual Property Office of the People's Republic of China in counterpart Chinese Patent Application No. 201180043229.8.
Australian Office Action No. 2011300081 dated Dec. 18, 2013.

* cited by examiner

FIG. 10

| PLAYER ID INFO | PET INFORMATION | | | | | BENE-FIT INFO | NUM-BER OF PO-INTS |
|---|---|---|---|---|---|---|---|
| | ATTRIBUTE INFO | | | AT-HOME SITUA-TION | LOCATION INFO | | |
| | TYPE | EQUIP-MENT | SKILL | | | | |
| xxxx | RABBIT | CAPE | SONG | 0 | yyyy | - | - |
| yyyy | BIRD | CROWN | DANCE | 1 | yyyy | - | - |

| PLAYER ID INFO | PLAY INFORMATION | | | |
|---|---|---|---|---|
| | PLAY HISTO-RY | GAME DEVICE ID INFO | HOUSING ID INFO | FACILITY ID INFO |
| xxxx | - | - | - | - |
| yyyy | - | - | - | - |

| PLAYER ID INFO | FRIEND INFORMATION | | |
|---|---|---|---|
| | FRIEND ID INFO | OFFEREE OFFEROR | |
| xxxx | yyyy | yyyy | |
| yyyy | xxxx AAAA | | xxxx AAAA |

GAME SYSTEM

TECHNICAL FIELD

The present invention relates to a game system for enabling communication among players.

BACKGROUND ART

Patent Document 1 discloses a network game system with a chat function. In this game system, communication among players through chatting is enabled.

PRIOR ART DOCUMENT

Patent Document

Patent Document 1: Japanese Patent Application Laid-Open Publication No. 2009-39305

DISCLOSURE OF INVENTION

Problems to be Solved by the Invention

However, because communication among players through chatting is direct communication in which words a player uttered (words that a player input) are conveyed to an opponent in real time, such communication is sometimes too much for a player. For example, when a player who is poor in conversation chats with an opponent when first meeting, the player is subject to an excessive emotional burden. This becomes an obstacle for facilitating communication among players.

Accordingly, the present invention has as an object to provide a game system for enabling indirect communication among players.

DISCLOSURE OF INVENTION

A game system according to the present invention has: plural game devices, each game device allowing a player to play a game and displaying a character of a player; and a storage device that stores, in association with player identification information uniquely identifying a player, location information identifying a game device at which a character of the player is located, out of the plural game devices, each of the plural game devices having: an identification information obtainer that obtains player identification information of a player; and a game controller that causes the game device to display a character of a player identified by player identification information corresponding to location information identifying the game device in the storage device, and, in a case in which location information stored in association with player identification information of a first player who plays at a first game device among the plural game device is changed to that which identifies a second game device at which a second player plays, the second game device differing from the first game device, the first game device does not display a character of the first player and the second game device displays the character of the first player.

A player ID is used as the "player identification information", and at least one player ID is assigned to each player. Because there are no duplicate player IDs, a player can be uniquely identified.

The "character" is a virtual entity that is not an object of an operation by a player such as a virtual pet of a player on a game device, and does not include a virtual entity that is an object of an operation.

In this game system, the movements of pets among game devices are represented by display or non-display of a character. Therefore, a player is able to understand visually the presence or absence of the player's own character or a character of another person at a game device at which the player plays. Also, in this game system, a character can be displayed in parallel to a game play. Therefore, going out or returning home of the player's own character and the visiting or exiting of the character of another player can take place during the play at a game device at which the player plays.

Also in this game system, the location information of a character of a player is stored in association with player identification information of the player. Therefore, based on an event that has taken place in a play at a game device at which the character of the player is located, various information items corresponding to the player identification information of the player can be updated, or some sort of event can be caused to take place at a game device identified by the player identification information (game device at which the player plays).

Thus, according to this game system, using a character that moves among plural game devices in parallel to a game play allows indirect communication among players. In this communication, the burden on the player is less than the burden on the player in direct communication among players. According to this game system, communication among players can be facilitated.

A player ID can be used as the location information of a character. In a game system in which player identification information is used to identify a player as in this game system, the player identification information and play information are managed in association with each other in general, the play information identifying a game device at which a player identified by the player identification information plays. Because the play information is information uniquely identifying a game device, a game device can be identified at which a player having the player ID plays. It is to be noted that information that is identical with the play information can be used as the location information of a character. In this case, the location information of a character will be information directly identifying a game device.

Also, as is obvious from the foregoing description, a player ID or information that is identical with the play information can be used as "location information".

The "first game device" is a freely selected one of plural game devices, and the "second game device" is a freely selected game device differing from the first game device of plural game devices. Also, one location information item can be changed more than twice. For example, location information that has been changed from that which identifies the first game device to that which identifies the second game device can be changed to that which identifies the third game device that is neither the first game device nor the second game device.

The "identification information obtainer" is, as a first example, what is provided with a card reader and a communication unit. In this case, the card reader reads, from a card, a card ID identifying the card, and the communication unit transmits this card ID to a server device. The server device, having received this card ID, returns the player ID pre-associated with this card ID. This player ID is then received by the communication unit. A second example is a card reader itself. In this case, the card reader reads a card ID from a card. The read card ID is treated as player identification information uniquely identifying a player. A third example is an input unit for a player for inputting information that is equivalent to the player identification information (for example, player ID). As an alternative to an IC card and a card ID, a portable phone and unique identification information recorded in the portable phone may be used.

The "game" may be a bingo game, a horse racing game, or a video game (for example, a mahjong game or a role playing game).

In the above game system, in a case in which location information stored in association with the player identification information of the first player is that which identifies the second game device and in which a predetermined game result is obtained as a result of the game controlled by the second game device, the first game device may grant a predetermined benefit to the first player.

According to this game system, additional motives for communication among players can be provided.

The "predetermined game result" is, for example, the acquisition of a right to transfer from a normal game normally performed to a specific game specially performed (privilege).

The "predetermined benefit" is, for example, credit or non-credit.

The "credit" is a game value that is exchanged for a game play. In a case in which an equivalent value of a play is one credit, the credit is equivalent to a right to play. For example, the credit is deposited from outside as a result of physically inserting or electrically transferring a medal (token coin) or cash. Also, the credit is used and consumed in exchange for a play.

The "non-credit" is a game value that cannot be exchanged for a game play. The non-credit is, for example, an item and a point. The item is, for example, a virtual item usable in a game such as a sword or costume. The examples of a point include those which can be exchanged for an item equivalent to the number of points, those for which a title equivalent to the number of points is conferred to a player, and those for which the right to transfer from the normal game to the specific game can be gained if the predetermined number of points is collected.

In this game system, each of the plural game devices may additionally have a transmitter that transmits a message to another game device; and a receiver that receives a message from another game device, and the first game device may be able to transmit a message to the second game device in a case in which the predetermined benefit is granted to the first player.

According to this game system, because a message transmitted from a first player to a second player is a thank-you message for granting a predetermined benefit, the second player never feels a sense of strangeness about a message from another person (the first player). Also, a timing at which the message from the first player can be transmitted is set to an appropriate timing that does not disturb the play of the second player. Therefore, the first player does not have to consider an appropriate timing for transmitting a message with consideration to the current situations of the second player. Thus, more effective communication can be elicited.

In each of the above game systems, in a case in which location information stored in association with the player identification information of the first player is changed from that which identifies the second game device to that which identifies the first game device, it may be configured so that the second game device does not display the character of the first player and that the first game device displays the character of the first player.

In this game system, a series of cycles can be repeated of a character of the first player going out from the second game device to visit the first game device (i.e., returning to the first game device) after going out from the first game device to visit the second game device. The "going out from a game device" and "visiting a game device" indicate going out from an imaginary space and a visiting an imaginary space, in a case in which the game device is regarded as a personal imaginary space (for example, home) of a player who plays at the game device.

In this game system, each of the plural game devices may additionally have: an offering unit for offering the second player the engagement of a predetermined relationship with the first player; and an accepting unit for accepting an offer, from the second player, for the engagement of the predetermined relationship with the first player, and the offering unit may allow the offering for the engagement of the predetermined relationship from the first player to the second player only in a case in which location information stored in association with the player identification information of the second player is that which identifies the first game device or in a case in which location information stored in association with the player identification information of the first player is that which identifies the second game device, and the accepting unit may allow the first player to accept the offer for the engagement of the predetermined relationship from the second player only after the first player is offered the engagement of the predetermined relationship from the second player, and the predetermined relationship of which the engagement is offered to the first player from the second player may be engaged only in a case in which the accepting unit accepts the engagement of the predetermined relationship.

The "predetermined relationship" is, for example, friendship. In this game system, a period during which the engagement of the predetermined relationship can be offered from the first player to the second player is limited to a period in which a character of the second player visits the first game device. On the other hand, the second player can accept the offer any time after the engagement of the predetermined relationship is offered from the first player. In a case in which the predetermined relationship is friendship, a player is compelled to immediately decide whether to accept the offer in direct communication between two parties. However, in indirect communication through this game system, there is no need to immediately decide whether to accept the offer. This is an advantage in that the mental burden of a player to whom something is offered and a player who is making an offer can be reduced.

In this game system, in a case in which the first player and the second player have engaged in the predetermined relationship and in which a second predetermined game result is obtained as a result of the game controlled by the first game device, location information stored in association with player identification information of the second player may be changed to that which identifies the first game device in the storage device. According to this game system, for example, in reaching Bingo in a bingo game or in gaining the right to transfer from the normal game to the specific game, a production can be carried out such as a character of a friend coming to visit the game device of the player to utter a congratulation message.

In a game system in which the predetermined relationship can be engaged, the storage device may store, in association with the player identification information, attribute information indicating an attribute of the character of the player, and each of the plural game devices may further have an attribute information obtainer that obtains, from the storage device, attribute information corresponding to location information identifying the game device itself in the storage device, and the game controller may cause the game device to display the character based on attribute information obtained by the attribute information obtainer.

Moreover, in the storage device, attribute information of the character of the first player may be changed based on a result of the game the first player played, based on a result of the game a player who has engaged in the predetermined relationship with the first player played, or based on the number of players who has engaged in the predetermined relationship with the first player.

In this case, for example, because a character of a player grows up (changes) depending on a game result of the player, the emergence of players who play games for the growth of their own characters and the increase in the number of such players are likely. For example, because a character of a player grows up based on a game result of the player's friend or based on the number of friends of the player, players who play games for the growth of their own characters are likely to communicate actively to increase friends, and the emergence of players who frequently play games for communicating actively and the increase in the number of such players are likely.

Each of the above game systems may additionally have a server device having a communication unit for communicating with each of the plural game devices, and the storage device may be provided at the server device. Alternatively, the storage device may be provided in each of the plural game devices.

In the game system of the former, the number of server devices can be one or more than one. In a case in which there are plural server devices, each of the plural server devices will have a storage device. In this case, each server device causes its storage device to be synchronized with a storage device of another server device. As an alternative, information items to be stored are dispersed among plural server devices.

In the game system of the latter, each game device causes its storage device synchronized with a storage device of another game device. However, in the game system of the latter, in a case in which the game device has the attribute information obtainer, a storage device from which attribute information is obtained by the attribute information obtainer of each game device is a storage device of the game device.

Also, in the game system of the former, the server device may notify the change of information (for example, location information) in the storage device to a game device that is pertinent to this change, or each game device may voluntarily check to see whether there was any change in information stored in the storage device. The voluntary confirmation is realized, for example, by each game device transmitting a request to the server device at predetermined time intervals. When each game device voluntarily makes a confirmation, in a case in which there are plural server devices and in which information items to be stored in storage devices are dispersed among server devices, each game device confirms with every server device.

BRIEF DESCRIPTION OF THE DRAWINGS

FIG. 10 is a diagram showing a data configuration according to a modification of game system 100.

BEST MODE FOR CARRYING OUT THE INVENTION

A: Configuration of Embodiment

A-1: Game System 100

Figure 1:
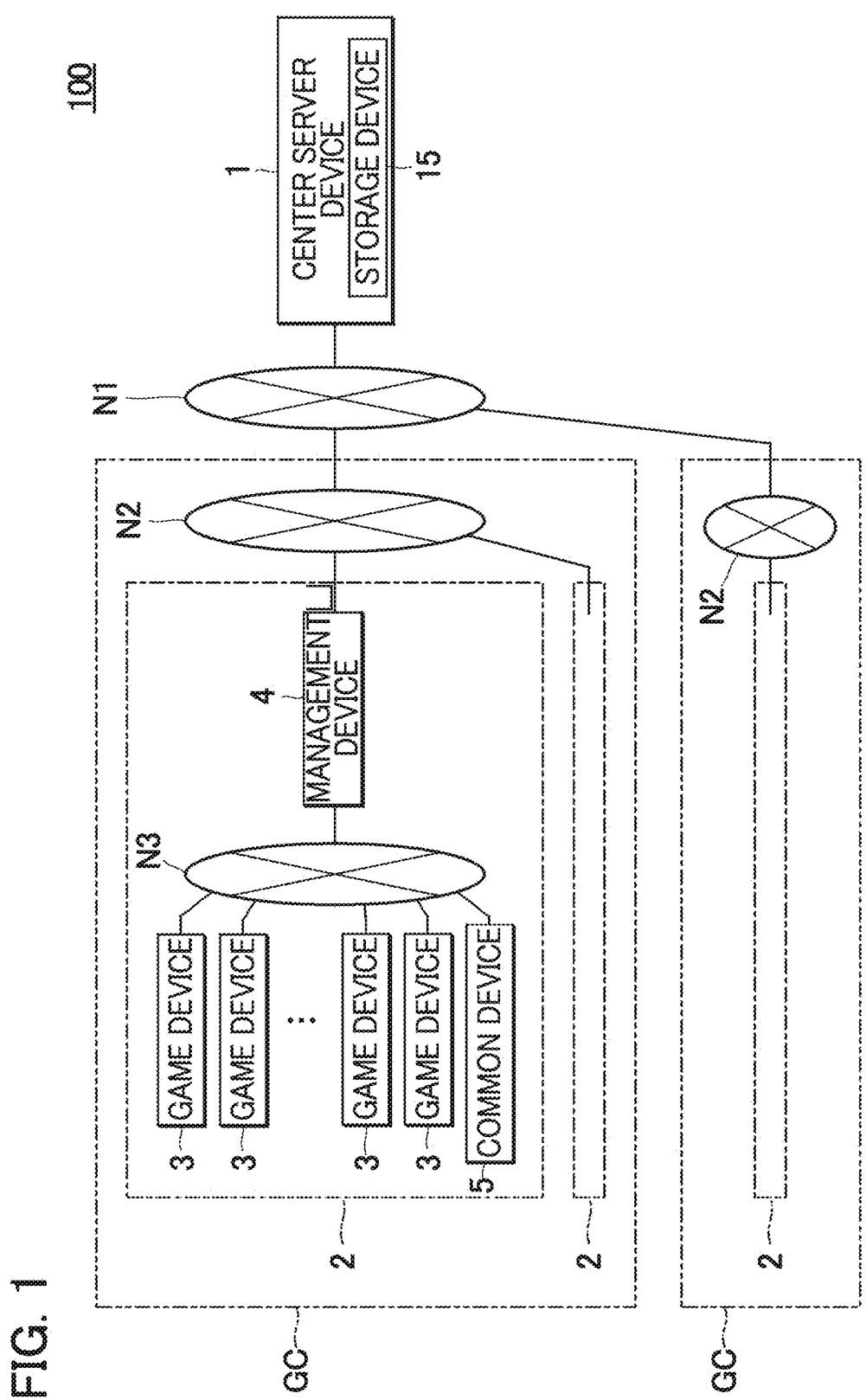
FIG. 1 is a block diagram of game system 100 according to an embodiment of the present invention.

FIG. 1 is a block diagram of an embodiment according to a game system 100 of the present invention. Game system 100 is a computer network system for allowing plural players (users) to play a game and to perform communication using pets. Game system 100 has plural game housings 2 and a center server device 1. As described later in detail, center server device 1 is a server device (computer) with various functions.

Each of plural game housings 2 is sited at recreation facilities GC such as game centers (game halls), etc. Each of these recreation facilities GC is connected to center server device 1 via communication network N1. Each of plural game housings 2 is capable of communicating with center server device 1 with each other via communication network N2 and communication network N1. In this communication, a facility ID for uniquely identifying recreation facility GC in game system 100 is used as a communication address. In a case in which plural game housings 2 are sited at a single recreation facility GC, a housing ID uniquely identifying game housing 2 at the recreation facility GC is also contained in the communication address. Communication network N1 is realized, for example, by a WAN (wide area network) and a VPN (virtual private network) using the Internet, and communication network N2 is realized by a LAN (local area network).

A game played in game system 100 advances while consuming credit, and is a game in which credit and a point can be granted depending on a result of a game, specifically, a bingo game that is playable repeatedly. The credit is a value to be exchanged for a play of a game, and is consumed when used in exchange for a play. That is, a player will repeatedly play a bingo game while consuming credit. In game system 100, the number of credits, that is the number of credits owned by a player, and the number of points, that is the number of points owned by a player, are managed.

In each round of a game, a mechanical drawing or lottery is performed in which a small number of numerals are selected from a large number of numerals. Also, each round of a game is categorized into a normal game normally performed or a specific game specially performed. To play the specific game is an objective of a player, and in a case in which the number of points reaches the predetermined value, the transfer from the normal game to the specific game is performed. Thus, the point is a unit that configures the right to transfer from the normal game to the specific game.

A-2: Game Housing 2

Game housing 2 has plural game devices 3, a management device 4, and a common device 5. Each of plural game devices 3 is capable of communicating with management device 4 and common device 5 with each other via communication network N3 built in game housing 2. In this communication, a game device ID uniquely identifying game device 3 in game housing 2 is used as a communication address. In the following description, a communication network including communication network N1, all communication networks N2, all management devices 4, and all communication networks N3 will be referred to as a communication network N. It is to be noted that the present embodiment may be modified so that the number of game devices 3 provided at one game housing 2 is one.

A-3: Common Device 5

Common device 5 is a device that controls the progress of a common process, a result of which is used in all games played at game housing 2. Common device 5 repeatedly executes the common process, and when the common process ends, simultaneously transmits a result of the common process to all game devices 3 in the same game housing 2. The common process controlled by common device 5 is, specifically, the above mechanical drawing.

The common process controlled by common device 5 is, specifically, a mechanical drawing in which one or a plurality of numerals is selected from multiple numerals. The method of the mechanical drawing can be freely selected. For example, common device 5 may be provided with a round board rotating around a vertical rotation axis and a mechanism for dropping one or plural balls on the board, the round board having multiple holes formed corresponding to the multiple numerals in the peripheral area thereof. Common device 5 may select, from the multiple numerals, those one or a plurality of numerals corresponding to a hole or holes into which the balls dropped on the board fall in.

A-4: Management Device 4

Management device 4 is a server device (computer) that manages all game devices 3 and common device 5 in the same game housing 2. Management device 4 stores game device IDs of these game devices 3 and a housing ID of the game housing 2. Management device 4 relays information transmitted or received between communication network N3 in the game housing 2 and communication network N2. It is to be noted that communication via communication network N1 requires relaying using a facility ID. This relay is performed by a relay device (not shown; for example, a router) that mutually connects communication network N1 and communication network N2.

Also, management device 4 has the same function as center server device 1, and can act for center server device 1. However, management device 4 acts for center server device 1 only in a case in which center server device 1 is not used (for example, a case in which communication network N1 is not used).

A-5: Center Server Device 1 and Game Device 3

Game system 100 implements various functions, among which a characteristic function is communication that each player performs by using a character corresponding to oneself. This communication is enabled by center server device 1 and each game device 3, the center server device and each game device working in cooperation with one another. Accordingly, center server device 1 and each game device 3 are configured so that this communication is enabled. It is to be noted that, in game system 100, a character respectively corresponding to each player is represented as a pet owned respectively by each player.

A-5-1: Overview with Communication

Figure 2:
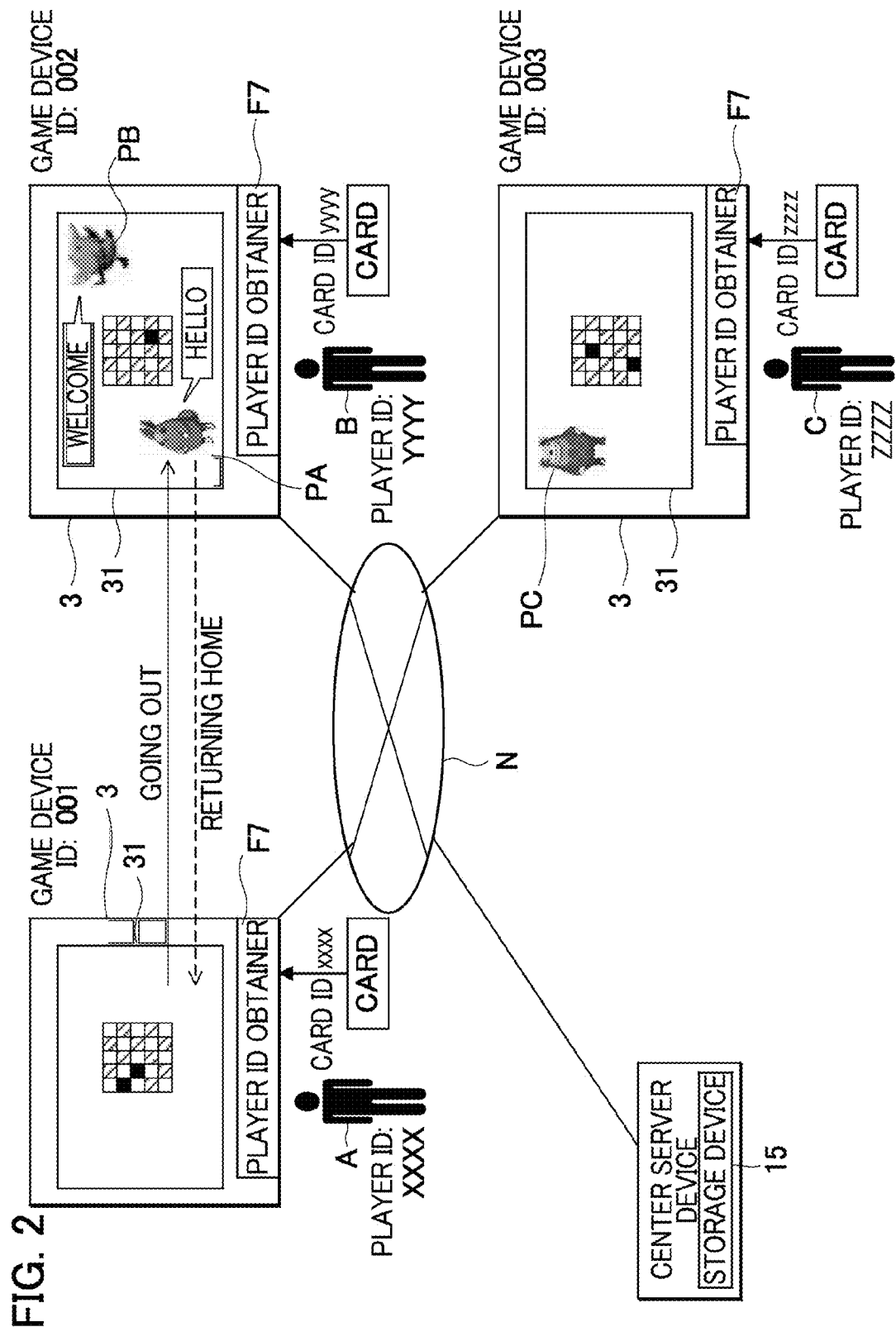
FIG. 2 is a diagram for explaining an overview of communication using pets among players in game system 100.

FIG. 2 is a diagram for explaining an overview of communication using pets among players. This diagram shows, as an example, a configuration in which three game devices 3 each and center server device 1 are connected via communication network N. The three game devices 3 may be freely extracted from all game devices 3 in game system 100 and are not necessarily included in the same game housing 2.

As shown in FIG. 2, game device 3 has a display unit 31. Display unit 31 is, for example, a liquid crystal display device, and it displays a game progress and result and a player's pet. A player willing to play a game at game device 3 inputs a card ID recorded in an IC card of the player into game device 3. Player ID obtainer F7 of this game device 3 obtains a player ID corresponding to the card ID for which the input has been received. Accordingly, a pet of this player will be displayed on display unit 31 of this game device 3, and a game play using the pet will be allowed.

The card ID is identification information for uniquely identifying an IC card, and the player ID is identification information for uniquely identifying a player. A player ID of a registered player is associated with a card ID recorded in an IC card owned by this player. Center server device 1 receives a card ID and can reply with a player ID associated with the card ID. However, a dedicated server device differing from center server device 1 may be used to receive a card ID and reply with a player ID associated with the card ID. Also, a portable phone and a unique identification information item recorded therein may be used instead of the IC card and the card ID.

The home (reference location) of a pet is game device 3 at which a player owning the pet plays. The pet can move from the home to another game device 3 (going out), and move from another game device to the home (returning home). These movements and the presence or absence of the pet at game device 3 are represented by an exclusive display, among game devices, of a pet. Therefore, there will be no instance of the same pet being displayed at plural game devices at the same time except in special circumstances such as process delay.

For example, in FIG. 2, only a bingo card is displayed on display unit 31 of game device 3 (game device ID: 001) at which a player A plays; a bingo card, a pet PA of player A, and a pet PB of a player B are displayed on display unit 31 of game device 3 (game device ID: 002) at which player B plays; and a bingo card and a pet PC of a player C are displayed on display unit 31 of game device 3 (game device ID: 003) at which player C plays. These represent that pet PA is outside the home and is staying at game device 3 at which player B plays, that pet PB is at game device 3, which is the home thereof, and that pet PC is at game device 3, which is the home thereof.

Also, a pet can hold a conversation with another pet by using means such as speech balloons, etc. For example, pet PA having visited game device 3 at which player B plays says "hello" to pet PB that is at home at game device 3, and pet PB says "welcome" to pet PA. These conversations are represented by display of game device 3.

At game system 100, in a case in which a first predetermined game result (for example, obtaining the right to transfer to the specific game) is obtained at game device 3 at which a pet which is outside the home is staying, a benefit is granted to a player who is the owner of this pet. At this time, a game device at which the player plays can transmit a thank-you message for the grant of the benefit to game device 3 where the first predetermined game result was obtained. Also, a pet can deepen exchanges among players through movements among game devices 3 and through conversations with another pet. A pet can also intervene in the engagement of friendship among players, which can be a condition that affects the progress of a game. Also, the attribute of a pet changes based on a game result and exchanges among players. Such actions and changes of a pet are also represented by display by game device 3.

A-5-2: Center Server Device 1

Figure 3:
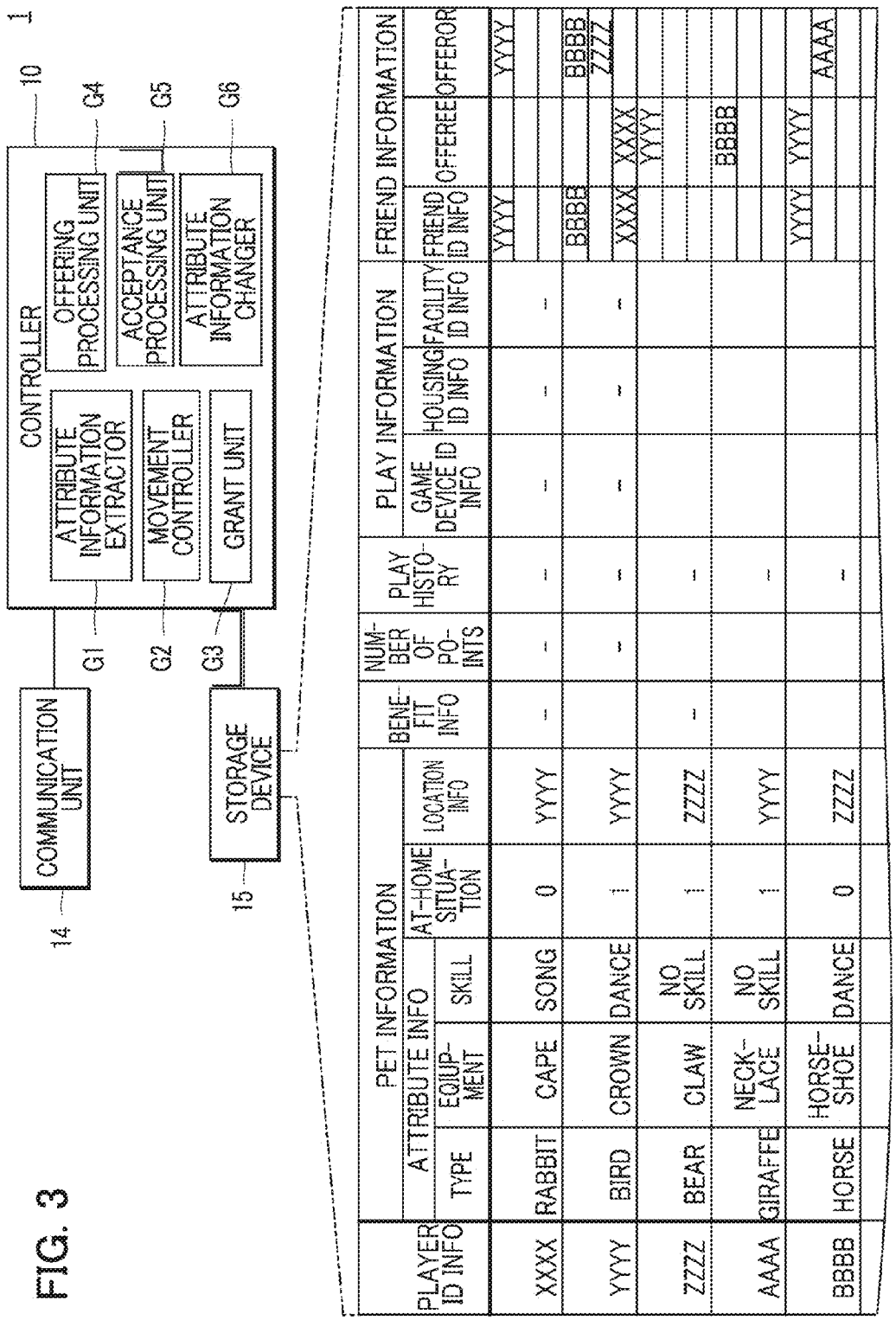
FIG. 3 is a block diagram of center server device 1 in game system 100.

FIG. 3 is a block diagram showing center server device 1. As shown in the figure, center server device 1 has a communication unit 14, a storage device 15, and a controller 10 for controlling each unit. Communication unit 14 is a wired or wireless communication interface, and relays information between controller 10 and communication network N1. Center server device 1 has communication unit 4, thereby to be able to communicate with each of plural game devices 3. Storage device 15 is configured of a storage device such as a hard disk and stores various types of information.

Storage device 15 has stored therein, as one record, in association with a player ID of a registered player, pet information for a pet of the player, benefit information including information indicating a benefit granted to the player, and information indicating the current number of points for the player, information indicating a play history of a game for the player, play information identifying game device 3 at which the player plays, and friend information indicating the status of the engagement of friendship between the player and another player.

In the following, in some cases, a field for storing the player ID will be referred to as "player identification information field", a field for storing pet information as "pet information field", a field for storing benefit information as "benefit information field", a field for storing the number of points as "the number of points field", a field for storing a play history as "play history field", and a field for storing play information as "play information field", and a field for storing friend information as "friend information field".

The pet information (pet information field) includes attribute information indicating an attribute of a pet (attribute information field), information indicating an at-home situation of the pet (at-home situation field), and location information identifying game device 3 where the pet is located (location information field). The attribute information is information indicating a type of the pet, information indicating equipment of the pet, and information indicating a special skill of a pet. For example, the attribute information of a pet of a player identified by a player ID, AAAA, includes information indicating that the type is a giraffe, information indicating that the equipment is a necklace, and information that there is no skill. Various types of information can be used as the attribute information of a pet (character). The attribute information at least includes information based on which a display manner of the pet (character) can be decided. The information based on which the display manner can be decided is, for example, information indicating a type of a pet and information indicating equipment of the pet. In the above example, a giraffe wearing a necklace is the display manner. The at-home situation includes "1" indicating that a pet is home (the pet is located at game device 3 at which the player who is the owner of the pet plays), and "0" indicating that the pet is outside home, i.e., staying at another player's home (the pet is located at game device 3 at which another player differing from the player who is the owner of the pet plays).

In the present embodiment, a player ID of a player who plays at game device 3 where a pet is located is used as location information indicating the location of the pet. As described above, there is stored in storage device 15, in association with the player identification information of a player, play information that identifies game device 3 at which the player plays. Therefore, by identifying a player ID from the player identification information field, it is possible to identify game device 3 at which a player identified by the player ID plays. The location information of a pet corresponds to a player ID of a player who is the owner of the pet. In other words, the initial location of a pet is at home (i.e., game device 3 at which a player who is the owner of the pet plays). Of course, the present embodiment can be modified to make the initial location of the pet other than home (i.e., game device 3 at which another player differing from the player who is the owner of the pet plays).

The benefit information includes information indicating a benefit granted to a corresponding player and information identifying game device 3 at which the player plays and where a game result was gained, the game result triggering the grant of the benefit. The benefit is, for example, the number of points granted to a player. The player ID of a player who plays at game device 3 is used as information identifying the game device 3.

The number of points increases or decreases based on a result of a game the player is currently playing, and increases when granted based on a result of a game that a player differing from the player is currently playing. As information indicating the number of points, those associated with a player ID of a player who is currently not playing will be empty information. It is to be noted that the present embodiment may be modified so that the number of points is stored in game device 3 instead of center server device 1 and is not stored in center server device 1. The play history includes a result of a play of a game by a player (game result).

The play information (play information field) includes game device identification information that is information identifying game device 3 (game device identification information field), housing identification information that is information identifying game housing 2 that includes this game device 3 (housing identification information field), and facility identification information that is information identifying a recreation facility GC where the game housing 2 is located (facility identification information field). The game device identification information is a game device ID uniquely identifying game device 3 in game housing 2, and the housing identification information is a housing ID uniquely identifying game housing 2 in recreation facility GC. The facility identification information is a facility ID uniquely identifying recreation facility GC in game system 100. Play information that corresponds to a player ID of a player who is not currently playing is empty information.

Plural items of friend information can be associated with a player ID. It is to be noted that the present embodiment may be modified so that the number of friend information items associated with a player ID is one. The friend information includes friend identification information of a player with whom the friendship has been engaged (a player ID of a friend), information indicating an offeror who has offered the engagement of friendship to a player (a player ID of an offeror), and information indicating a player to whom the engagement of friendship is offered (a player ID of an offeree). Thus, the "friend information field" includes "friend identification information field", "offeree field", and "offeror field".

Controller 10 is configured of, for example, one or more CPUs (central processing units), and serves as an attribute information extractor G1 that extracts attribute information, a movement controller G2 that controls the movement of a pet, a grant unit G3 that grants benefits, an offer processor G4 that processes the offer for the engagement of friendship, an acceptance processor G5 that processes the acceptance of the offer for the engagement of friendship, and an attribute information changer G6 that changes attribute information of a pet.

The attributes of a pet of a player change based on game results of the player. Specifically, attribute information changer G6 refers to storage device 15, to change attribute information corresponding to a play history based on a game result contained in the play history. The attributes of the pet of the player also change based on game results of a friend of the player. Specifically, in a case in which the player is a first player and in which a friend of the player is a second player, attribute information changer G6 identifies, out of information corresponding to the play history of the second player, a player ID (i.e., the player ID of the first player) stored in the friend identification information field. Attribute information changer G6 changes the attribute information of a record that has the same player ID in the player identification information field (attribute information that is in association with the player ID of the first player) based on a game result contained in the above play history (the play history of the second player). The attributes of the pet of the player also change depending on the number of friends of the player. Specifically, attribute information changer G6 refers to storage device 15, identifies the number of friends based on the friend information, and changes attribute information that corresponds to the friend information based on the identified number of friends. Other function units G1 to G5 will be described later.

A-5-3: Game Device 3

Figure 4:
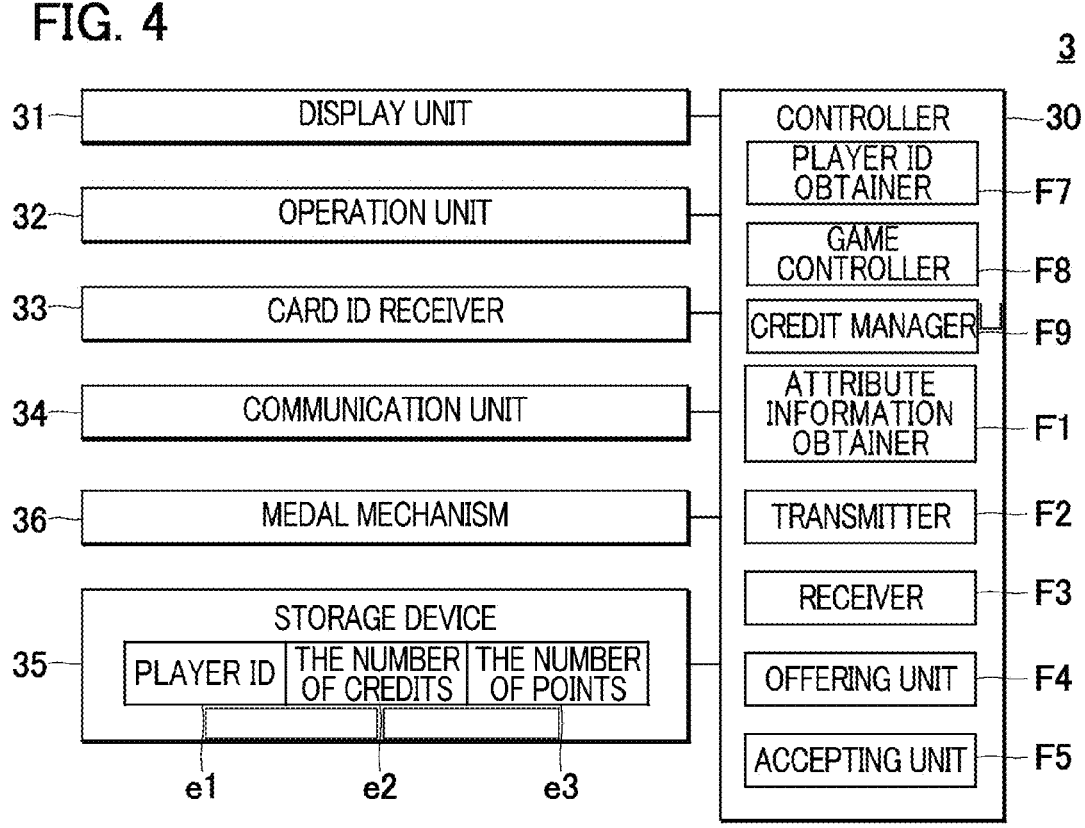
FIG. 4 is a block diagram of game device 3 in game system 100.

FIG. 4 is a block diagram of game device 3. Game device 3 is a game device (computer) for allowing a player to play a game, and has the above display unit 31, an operation unit 32, a card ID receiver 33, a communication unit 34, a storage device 35, medal mechanism 36, and a controller 30 for controlling each component.

Card ID receiver 33 receives an input of a card ID by a player. For example, a publicly known card reader for reading a card ID recorded in the IC card is employed as card ID receiver 33.

Operation unit 32 has an operator such as a button touched by a player, and receives an operation from the player. The operation received by operation unit 32 includes an operation for instructing the game, an operation for instructing the withdrawal of a medal, an operation for inputting a message, an operation for instructing the transmission of the message, an operation for instructing the offer for the engagement of friendship, and an operation for instructing the acceptance of the offer for the engagement of friendship.

Communication unit 34 is a wired or wireless communication interface, relays information transmitted and received between controller 30 and communication network N3.

Storage device 35 is a rewritable memory or storage device, and stores a player ID e1 of a player who plays a game at game device 3, the number of credits e2 of the player, and the number of points e3 of the player. The number of credits e2 decreases when credit is consumed, and increases when credit is deposited from outside and increases when credit is granted based on a game result of the player. In the present embodiment, the deposit of credit from outside is performed as a result of the physical input of the medal, but may be performed as a result of the electronic transfer or the physical input of cash. The number of points e3 agrees with the number of points stored in storage device 15 in association with the player ID of the player.

Medal mechanism 36 is configured of a medal detection sensor and a medal dispensing device. When a medal is input from a coin acceptance slot, medals are detected by the medal detection sensor one by one. Medal mechanism 36 notifies controller 30 of a detected signal, and accommodates the input medal to a container of medal mechanism 36. Also, medal mechanism 36 is controlled by controller 30 and dispenses medals accommodated in the container one by one from the medal dispensing device. Although not shown, the coin acceptance slot and the dispenser are formed on the surface of game device 3.

Controller 30 is configured of, for example, one or more CPUs, and serves as a player ID obtainer F7 that obtains a player ID of a player, a game controller F8 that controls a game which the player plays, a credit manager F9 that manages credit for the player, an attribute information obtainer F1 that obtains attribute information of a pet to be displayed at game device 3, a transmitter F2 that transmits a message to another game device 3, a receiver F3 that receives a message from another game device 3, an offering unit F4 that offers the engagement of friendship to another player, and an acceptance unit F5 that accepts an offer for the engagement of friendship from another player.

Player ID obtainer F7 is a function unit that obtains a player ID of a player, and in a case in which an input of a card ID (or identification information) is received at card ID receiver 33, communicates with center server device 1 via communication unit 34, and obtains a player ID that is associated with the input card ID from center server device 1. When player ID obtainer F7 obtains the player ID, controller 30 stores the obtained player ID e1 and storage device 35.

At center server device 1, in a case in which a request for obtaining player ID is made from game device 3, a game device ID of this game device 3, a housing ID of game housing 2 having this game device 3, and a facility ID of a recreation facility where the game housing 2 is sited are written and stored in storage device 15 in association with the player ID. Also, at game device 3, the number of credits e2 and the number of points e3 for a player identified by the player ID are written and stored in storage device 35. Hereinafter, the number of points that is associated with the player ID in storage device 15 of center server device 1 is synchronized with the number of points e3 stored in storage device 15 of game device 3.

Game controller F8 is a function unit for controlling a game for a player ID obtained by player ID obtainer F7 so as to progress based on an operation of operation unit 32 and on a result of the common process (mechanical drawing). Game controller F8 allows the player identified by the player ID to repeatedly perform the game, and updates as appropriate, in cooperation with center server device 1, play history stored in storage device 15 in association with the player ID. Game controller F8 causes the game device 3 to display a pet based on attribute information obtained by attribute information obtainer F1.

Credit manager F9 is a function unit that manages the number of credits e2. Credit manager F9 reduces the number of credits e2 when credit is consumed in a game or when a medal is dispensed by medal mechanism 36, whereas it increases the number of credits when a medal is input to medal mechanism 36 or when credit is granted in the game. Also, credit manager F9 controls medal mechanism 36 based on an operation of operation unit 32.

Attribute information obtainer F1 transmits, to center server device 1, a request for providing attribute information on a pet to be displayed on game device 3, and receives a response to the provision request from center server device 1. The provision request contains a player ID that is the same as player ID e1.

On the other hand, attribute information extractor G1 of center server device 1, upon receiving the provision request for attribute information, refers to storage device 15, to identify a record that has, in its location information field, the player ID contained in this request. Attribute information extractor G1 extracts attribute information from the identified record, to return a response containing the extracted attribute information to game device 3 that made the request. Game controller F8 having received game device 3 causes the game device 3 to display the pet based on the received attribute information.

As described above, in the present embodiment, the player ID is used as location information for identifying game device 3 at which the pet is located. Therefore, attribute information obtainer F1 can obtain, from storage device 15, attribute information of every record that has, in its location information field, a player ID (i.e., player ID which this player ID obtainer F7 has obtained) identifying itself (game device 3 having this attribute information obtainer F1). Accordingly, game controller F8 can cause game device 3 to display, based on attribute information that corresponds to every location information identifying the game device 3 itself (game device 3 identified by the player ID obtained by the player ID obtainer F7), a pet of a player identified by a player ID corresponding to the location information.

Grant unit G3 of center server device 1 grants benefits. This grant unit G3, refers to storage device 15 to, in a case in which a play history is updated, determine whether the latest game result contained in the play history is the first predetermined game result (for example, obtaining the right to transfer to the specific game). Only in a case in which a result of this determination is affirmative, grant unit G3 identifies location information that agrees with a player ID corresponding to the play history, and updates benefit information corresponding to the identified location information so as to indicate the predetermined benefit. The predetermined benefit is, for example, a certain number of points (for example, 1000 points).

Controller 30 of game device 3, when benefit information associated with the same player ID as player ID e1 (benefit information in a record having, in its player identification information field, the same player ID as player ID e1) is updated in storage device 15 of center server device 1, obtains the benefit information, and grants a benefit indicated by the obtained benefit information to a player who is playing at game device 3. Specifically, controller 30 updates the number of points e3 by adding the number of points (for example, 1000 points) indicated by the obtained benefit information, and changes the benefit information in storage device 15 to empty information in cooperation with grant unit G3 of center server device 1. It is to be noted that the number of points stored in storage device 15 in association with the player ID conforms to the number of points e3 by synchronization.

Thus, controller 30, in a case in which location information associated with a player ID of a first player who plays at game device 3 is one that identifies second game device 3 differing from game device 3, a predetermined benefit can be granted to the first player in a case in which the first predetermined game result is obtained as a result of a game controlled at second game device 3.

Transmitter F2, in a case in which benefit information is obtained, performs a message transmission process for transmitting a thank-you message to game device 3 at which a player (who granted the benefit) of a player ID contained in the benefit information plays. In the message transmission process, transmitter F2, in response to an instruction for transmission of the message through an operation of operation unit 32, transmits the message input through the operation of operation unit 32 to game device 3 at which a player who granted the benefit plays. Thus, transmitter F2 can transmit, in a case in which a benefit is granted to a player identified by player ID e1, a message to another game device 3 where a game result which triggered the grant of the benefit was gained (game device of a friend).

Offering unit F4 is a function unit for offering the engagement of friendship with a first player who plays at the game device 3 (first game device 3), the offering being made to a second player who plays at second game device 3 differing from first game device 3. As long as the location information stored in association with the player ID of the second player in storage device 15 is one that identifies the first game device 3, offering unit F4 permits the input of an instruction for offering the engagement of friendship to the second player through the operation of operation unit 32. In a case in which an instruction for offering the engagement of friendship is made, offering unit F4 transmits an offering request to center server device 1 for offering the engagement of friendship to the second player. The offering request includes the player ID of the second player who is the offeree, and the player ID of the first player who is the offeror.

Offering processing unit G4 of center server device 1, upon receiving an offering request, identifies from the player identification information field, a player ID that agrees with the player ID of the offeree (the player ID of the second player) contained in the offering request, to record, in the offeror field of friend information that is associated with the identified player ID, the player ID of the offeror (the player ID of the first player). Offering processing unit G4 then identifies, from the player identification information field, a player ID that agrees with the player ID of the offeror (the player ID of the first player) contained in the offering request, to record, in the offeree field of friend information that is associated with the identified player ID, the player ID of the offeree (the player ID of the second player) contained in the offering request.

Accepting unit F5 is a function unit for accepting an offer of the engagement of the friendship with the first player who plays the game device 3, the offering being made from a second player who plays at another game device 3. Accepting unit F5, as long as the engagement of friendship is offered from the second player, can accept the engagement of friendship from the second player. Specifically, accepting unit F5 causes display unit 31 to display that an offer has been made for the engagement of friendship from an offeror indicated by friend information stored in association with the player ID of the first player in storage device 15. When an instruction for accepting the engagement of friendship from the second player is input through an operation of operation unit 32, accepting unit F5 transmits an acceptance request for accepting the offer to center server device 1. The acceptance request contains the player ID of the second player as the offeror and the player ID of the first player as the offeree.

Acceptance processing unit G5 of center server device 1, upon receiving the acceptance request, identifies, from the player identification information field, one that agrees with the player ID of the offeree (the player ID of the first player) contained in the acceptance request, to record, in friend identification information field that is associated with the identified player ID, the player ID of the offeror (the player ID of the second player). Also, acceptance processing unit G5 identifies, out of player IDs stored in the player identification information field, one that agrees with the player ID of the offeror (the player ID of the second player) contained in the acceptance request, to record, in the friend identification information field that is associated with the identified player ID, the player ID of the offeree (the player ID of the first player). Thus, the friendship for which the engagement has been offered from the second player is engaged only if the offer is accepted by accepting unit F5 of the first game device 3. Therefore, in a case in which the friendship is not established even if the offering has been made, a player ID is recorded in the offeree field or in the offeror field, and no data is recorded in the corresponding friend identification information field. In other words, in a case in which player IDs are recorded in both of the offeree field and the friend identification information field, or in a case in which player IDs are recorded in both of the offeror field and the friend identification information field, it indicates that the friendship has been established.

Movement controller G2 of center server device 1 performs a going out process of realizing the going out of a pet and a returning home process of realizing the returning home of a pet. In the returning home process, movement controller G2 changes location information corresponding to a pet that is staying to location information indicating the home of the pet. Specifically, movement controller G2 refers to storage device 15, to identify location information corresponding to the at-home situation of "0", to change the identified location information to one that agrees with a player ID stored in association with the location information (one that is the same as the player ID of a player who plays at this game device 3).

This change is reflected through attribute information obtainer F1 and game controller F8 to the display of display unit 31. Specifically, in a case in which location information that is associated with the player ID of the first player who plays at the first game device is changed from one that identifies a second game device 3 differing from the first game device 3 to one that identifies the first game device 3, the pet of the first player is not displayed at the second game device 3, and the pet of the first player is displayed at the first game device 3.

In the going out process, movement controller G2 changes location information corresponding to a pet that is at home to another location information differing from the location information. Specifically, movement controller G2 refers to storage device 15, to identify location information corresponding to the at-home situation of "1", and changes the identified location information so as to indicate another game device 3 differing from game device 3 at which a player of a player ID that is associated with the location information is currently playing (a player ID differing from the player ID of the player who plays at the game device 3).

This change is reflected to the display of display unit 31 via attribute information obtainer F1 and game controller F8. Specifically, in a case in which the location information that is in association with the player ID of the first player who plays at the first game device is changed from one that identifies first game device 3 to one that identifies the second game device 3 differing from first game device 3, the pet of the first player is not displayed at the first game device, but the pet of the first player is displayed at the second game device 3.

In the present embodiment, information indicating the at-home situation is used to identify which pet to make go out. However, because the at-home situation of the pet can be determined based on the player ID of a player who owns the pet and location information associated with the player ID, information indicating the at-home situation can be deleted from storage device 15.

As a general rule, the location information is changed to one that is freely selected (for example, at random) out of game devices 3, excluding the home of the player where the player is currently playing. The determination as to whether a player is currently playing is performed by, for example, referring to storage device 15 to check whether the play information that is not empty information is associated with the player ID.

An exception to the change of location information is a case in which a second predetermined game result (for example, reaching Bingo) is obtained at game device 3 at which a player who has engaged in the friendship with any other player is currently playing. In this case, movement controller G2 changes location information corresponding to a pet of a player who is a friend of the player currently playing at the game device 3 to one that indicates the same game device 3. Specifically, when the second predetermined game result is added to one of play histories in storage device 15, friend information corresponding to the play history is identified. If the friend identification information in the friend information is not empty information, a player ID of the friend identification information in the friend information is identified from the player identification information field. Location information that is associated with the identified player ID is then changed to one that indicates the game device 3 at which the player having the player ID corresponding to the play history to which the second predetermined game result has been added (the player ID of the player who obtained the second determined game result) is playing. Thus, when a friend of a player who is the owner of a pet obtains the second predetermined game result, the pet moves to game device 3 at which the friend player is currently playing to congratulate the friend player.

B: Operation of Embodiment

Description will be next given of an operation of game system 100. However, because the detailed operations of game system 100 are apparent from the foregoing description, a representative example of game system 100 will be described here. In the following description, a simplified diagram of what they actually are will be referred to. Also, in the following description, game device 3 at which player A plays is referred to as game device 3A, and game device 3 at which player B plays is referred to as game device 3B. No friendship has been engaged between player A and player B.

Figure 5:
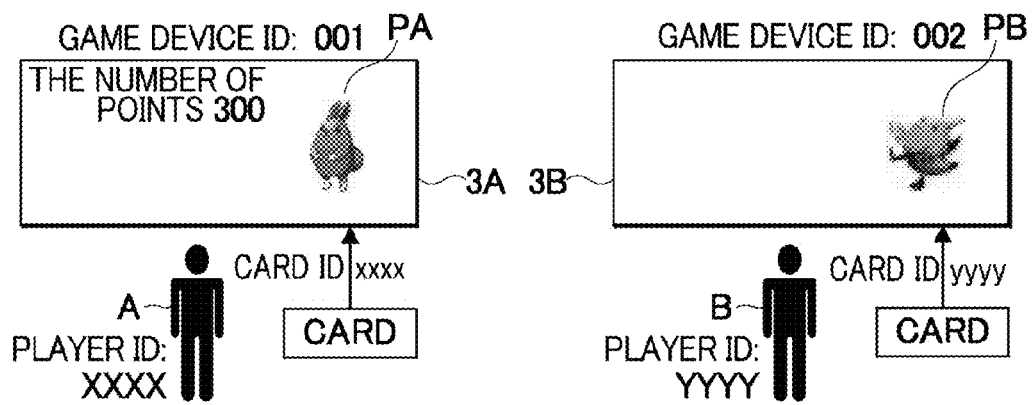
FIG. 5 is a diagram for explaining an operation of game system 100.

In this usage example, first, as shown in FIG. 5, a player ID, XXXX, of player A is obtained at game device 3A, and a player ID, YYYY, of player B is obtained at game device 3B. In this case, in storage device 15, location information that is associated with the player ID of player A is that which identifies game device 3A, and location information associated with the player ID of player B is that which identifies game device 3B. Therefore, a pet PA of player A is displayed only at game device 3A, and a pet PB of player B is displayed only at game device 3B.

Figure 6:
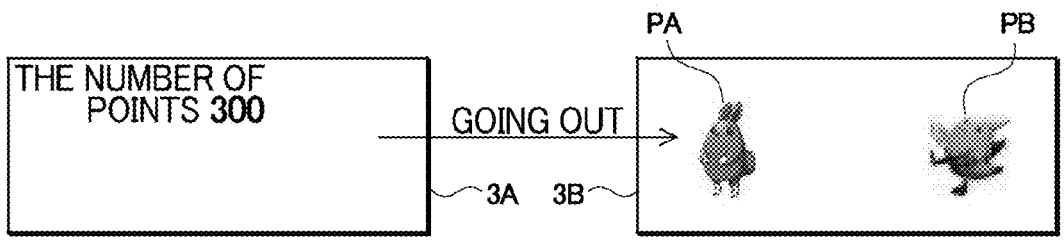
FIG. 6 is a diagram for explaining an operation of game system 100.

In this usage example, as shown in FIG. 6, pet PA then goes out to visit game device 3B. The above-described going out process is performed immediately before going out. In this going out process, location information associated with the player ID of player A is changed to that which identifies game device 3B in accordance with the general rule because no friendship has been engaged between player A and player B. As a result of going out, pet PA is not displayed at game device 3A, but is displayed only at game device 3B.

In this usage example, player B then offers the engagement of friendship to player A. This offer is possible because pet PA is staying at game device 3B. It is to be noted that, in a case in which player A offers the engagement of friendship to player B, pet PB needs to be staying at game device 3A.

Figure 7:
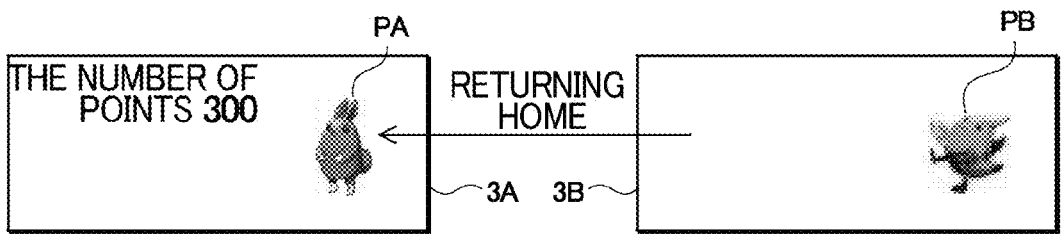
FIG. 7 is a diagram for explaining an operation of game system 100.

In this usage example, pet PA then goes home (FIG. 7). The above-described returning home process is performed immediately before this returning home process. As a result of returning home, pet PA is not displayed at game device 3B, and is displayed only at game device 3A. In this usage example, player A then accepts the above offer. As a result, the friendship is engaged between player A and player B.

In this usage example, player B then reaches Bingo. Then, to congratulate this, as shown in FIG. 6, pet PA goes out to visit game device 3B. In the going out process performed immediately before going out, as an exception for location information after change, location information that is associated with the player ID of player A is changed to what indicates game device 3B. As a result of this going out, pet PA is not displayed at game device 3A, but is displayed only at game device 3B. In a case in which player A reaches Bingo, pet PB goes out to visit game device 3A.

Figure 8:
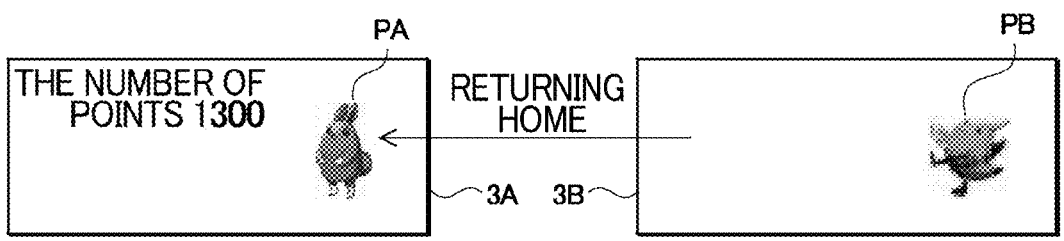
FIG. 8 is a diagram for explaining an operation of game system 100.

In this usage example, player B then obtains the right to transfer to the specific game (first predetermined game result). Then, game device 3A causes pet PA to come home as shown in FIG. 8. As a result of this, pet PA is not displayed at game device 3B, and is displayed only at game device 3A. Also, the number of points for player A increases from 300 to 1300 at this point. That is, a benefit (1000 points in this case) is granted to player A.

Figure 9:
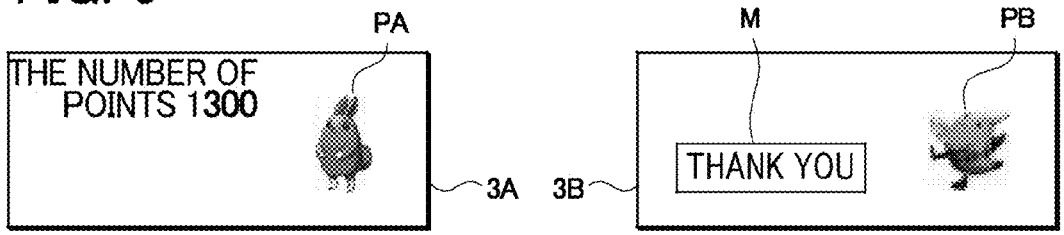
FIG. 9 is a diagram for explaining an operation of game system 100.

Hereinafter, game device 3A is ready for transmitting a message to game device 3B. In this usage example, player A inputs a message to game device 3A and inputs an instruction for transmitting the message. Then, as shown in FIG. 9, this message M is displayed at game device 3B. It is to be noted that in a case in which player A obtains the right to transfer to the specific game while pet PB is staying at game device 3A, a benefit is granted to player B, and game device 3B becomes ready for transmitting a message to game device 3A.

C: Summary of Embodiment

As described in the foregoing, game system 100 allows a player to play a bingo game, and has plural game devices 3 that display player's pets and storage device 15 that stores, in association with a player ID, attribute information indicating the attribute of a pet and location information identifying game device 3 at which the pet is located (is staying or is at home). Each game device 3 has player ID obtainer F7 that obtains a player ID of a player who plays at the game device 3, attribute information obtainer F1 that obtains from storage device 15 attribute information corresponding to location information identifying game device 3 identified by player ID obtained by player ID obtainer F7, and game controller F8 that controls a bingo game and causes the game device 3 to display a pet depending on attribute information obtained by attribute information obtainer F1. For example, in a case in which location information associated with the player ID, XXXX, of player A who plays at game device 3A is changed from that which identifies game device 3A to that which identifies game device 3B, game device 3A does not display pet PA, and game device 3B displays pet PA.

The movements of pets among game devices 3 are represented by display or non-display of the pets. Therefore, each player is able to visually understand whether each pet is present or absent. Also, in game system 100, a pet can be displayed in parallel to the play of the bingo game. Therefore, going out or returning home of a pet of a player's own, and visit or exit of a pet of another player can take place during the play. Also, in game system 100, in a case in which a game result at game device 3 at which the player's pet is staying is the first predetermined result, a benefit (point) is awarded to the player. Thus, according to game system 100, by using pets that move among plural game devices 3 in parallel to the play of a bingo game, the players can be prompted to new communication among players.

Also, in game system 100, for example, in a case in which location information that is associated with the player ID of player A is changed from that which identifies game device 3B to that which identifies game device 3A, pet PA is not displayed at game device 3B, and pet PA is displayed at game device 3A. Therefore, a series of cycles can be repeated of, after pet PA goes out from game device 3A to visit game device 3B, returning home from game device 3B to game device 3A.

Also, in game system 100, for example, in a case in which location information associated with the player ID of player A is that which identifies game device 3B and in which the first predetermined game result is obtained as a result of a bingo game controlled at game device 3B, game device 3A can grant a predetermined benefit to player A. This is advantageous because additional motives for communication among players can be provided. It is to be noted that a production may be carried out as if a pet returned with a benefit when granting a benefit.

In game system 100, game device 3 has transmitter F2 that transmits a message to another game device 3 and receiver F3 that receives a message from another game device 3. For example, game device 3A, in a case in which a predetermined benefit is awarded to player A, can transmit a message to game device 3B. Therefore, because a message transmitted from player A to player B is a thank-you message for the grant of the predetermined benefit, player B will not feel that the message from player A is strange. Also, because a timing at which a message can be transmitted by player A is set to a proper timing that does not interfere with the play of player B, player A does not have to consider a proper timing for transmitting a message, taking the present situations of player B into account. Thus, more effective communication can be elicited.

Also, in game system 100, for example, game device 3A has an offering unit F4 that offers player B the engagement of friendship with player A, and accepting unit F5 that accepts the offer, from player B, for the engagement of friendship with player A. Offering unit F4, only in a case in which location information associated with the player ID of player B is that which identifies game device 3A, allows player B to offer the engagement of friendship, and accepting unit F5, only after the engagement of friendship is offered from player B, allows the acceptance of the offer, from player B, for the engagement of friendship. The friendship of which the engagement is offered from player B to player A is engaged only in a case in which the offer of the engagement is accepted by accepting unit F5.

Thus, a period in which player A can offer player B the engagement of friendship with player A is limited to a period in which pet PB is staying at game device 3A, whereas player B can accept the offer any time after receiving from player A the offer of the engagement of friendship. In direct communication between two parties, a player is compelled to immediately decide whether to accept the offer for the engagement of friendship. However, in indirect communication through game system 100, there is no need to immediately decide whether to accept the offer. This is advantageous because the mental burden of a player who accepts the offer and a player who makes an offer can be reduced. Also, the mental burden of the players may be further reduced by carrying this out as if the offering of the engagement of the friendship and the acceptance thereof are performed among pets.

Also, in game system 100, for example, in a case in which player A and player B have the friendship engagement and in a case in which the second predetermined game result is obtained as a result of a game controlled at game device 3A, location information that is associated with the player ID of player B in storage device 15 is changed to that which identifies game device 3A. Thus, in a case in which a game result is the second predetermined game result (for example, reaching Bingo), a production can be carried out such as a pet of a friend player coming to visit to congratulate. A production may be carried out in such a way that the pet which has come to visit to congratulate to give a congratulation message.

Also, in game system 100, for example, in storage device 15, attribute information of pet PA of player A is changed based on a result of a game player A played, on a result of a game a player who has engaged in the friendship with player A played, or on the number of players who engaged in the friendship with player A (the number of friends). Thus, because the player's pet grows up (changes) based on a game result of the player, the emergence of players who play games for the growth of their own pets or the increase in the number of such players, are likely. Also, because a player's pet grows up based on a game result of the player's friend, or grows up based on the number of friends of the player, players who play games for the growth of their own pets are likely to communicate actively to increase friends, and the emergence of players who frequently play games for communicating actively and the increase in the number of such players are likely.

Moreover, in game system 100, management device 4 can substitute center server device 1. That is, management device 4 has functions units corresponding to attribute information extractor G1, movement controller G2, grant unit G3, offering processing unit G4, acceptance processing unit G5, and attribute information changer G6 and a storage device corresponding to storage device 15. Therefore, in a case in which center server device 1 is not available or in a case in which communication network N1 is not available, the above operation can be realized.

In the present embodiment, if the above-described various functions can be realized, any communication system can be employed between center server device 1 and game device 3. For example, center server device 1 may notify the change of information (for example, location information) stored in storage device 15 to game device 3 that is pertinent to this change (push-type communication), or game device 3 may voluntarily check to see whether there was any change in information stored in storage device 15 (pull-type communication). The voluntary check is realized, for example, by game device 3 transmitting a request to center server device 1 at predetermined time intervals.

D: Modifications

The present invention may include in its scope not only the above embodiments but also various embodiments obtained by modifying the above embodiments and also those that are obtained by appropriately combining two or more of these embodiments and the above embodiments.

D-1: Modification 1

The conversations of pets may be represented not by the speech balloons but by emitting sounds. A character other than pets may be employed as long as the character is not a virtual entity operated in a game play. It may be configured so that relationship (for example, competitor relationship) other than friendship can be engaged. The first predetermined game result and the second predetermined game result may be the same. The "game" may be a bingo game, a horse racing game, or a video game (for example, a mahjong game, a role playing game, etc.). As is obvious from this, the contents of the first predetermined game result and the second predetermined game result can be freely selected.

D-2: Modification 2

Non-credit other than points may be employed as a benefit to be granted. Non-credit is a game value that is not exchangeable for a play of a game. The non-credit other than points is, for example, an item. The item is, for example, a virtual item usable in a game such as a sword or costume usable in the game. The examples of a point as a benefit include those which can be exchanged for an item equivalent to the number of points and those for which a title equivalent to the number of points is conferred to a player. Also, credit may be granted as a benefit.

D-3: Modification 3

In the above embodiment, a cycle of going out and returning home is repeated. However, it may be configured so that a pet moves, without returning home from a game device at which it is staying, to another game device to stay. That is, location information may be changed more than twice without reverting to that which identifies home. For example, location information that is changed from that which identifies first game device 3A to that which identifies second game device 3B may be changed to a third game device 3, which is neither first game device 3A nor second game device 3B. As is obvious from this, in a case in which location information that is associated with the player ID of the first player with the first game device is changed to that which identifies second game device 3 differing from first game device 3, the present invention can include an embodiment in which first game device 3 does not display the first player's pet and in which the second game device 3 displays the first player's pet.

D-4: Modification 4

In the above-described embodiment, game device 3 receives an input of a card ID identifying an IC card, to obtain a player ID that is associated with this card ID from center server device 1, but the present invention is not limited thereto. For example, the input card ID may be used as a player ID. Also, a player may manually enter a player ID. The same can apply to a case of using a portable phone and identification information recorded in the portable phone instead of an IC card and a card ID.

D-5: Modification 5

In the above-described embodiment, as location information, a player ID of a player who plays at game device 3 located is used but a game device ID that uniquely identifies game device 3 may be used. The game device ID is, for example, a communication address. The communication address of game device 3 can be, for example, a combination of a game device ID, a housing ID, and a facility ID, a combination of a game device ID and a housing ID, or a game device ID itself.

D-6: Modification 6

In the above embodiment, a pet is displayed depending on the attribute information, but a pet may be displayed depending on information differing from the attribute information. For example, a pet may be displayed depending on a player ID of the owner of a pet. In this case, a pet image that is displayed depends on a player ID.

D-7: Modification 7

In the above-described embodiment, as information identifying game device 3 at which a player identified by a player ID is playing, a game device ID, a housing ID, and a facility ID are given as examples, but it is also possible to identify game device 3 with another piece of information. In this case, a game device ID, a housing ID, and a facility ID are used only for determining whether a player is currently playing. Because this determination can be made with another piece of information, the game device ID, the housing ID, and the facility ID may be deleted from storage device 15.

In the above-described embodiment, a game device ID, a housing ID, and a facility ID used as a communication address are stored in storage device 15, but it may be configured so that these information items are not stored in storage device 15. For example, in transmitting a message M from a first game device to a second game device, center server device 1, having received a request from the first game device, transmits an inquiry request containing a player ID of a player who plays at the second game device to all other game devices. From among game devices having received the inquiry request, only the game device (second game device) at which the player identified by the player ID is playing replies with a response containing a game device ID, a housing ID, and a facility ID to center server device 1. In response, center server device 1 may transmit a message M with the game device ID, the housing ID, and the facility ID contained in the response as a destination communication address. Also, center server device 1 having received the request from the first game device may transmit message M with the player ID of the player who plays at the second game device to all other game devices, so that only the game device (second game device) at which a player identified by the player ID is playing receives the message M.

D-8: Modification 8

In the above embodiment, data configuration represented in one table is employed as the data configuration of information stored in storage device 15, but another data configuration may be employed. For example, as shown in FIG. 10, a data configuration represented in plural tables can be employed. In this case, the player ID is common to all the tables.

D-9: Modification 9

The above embodiment may be modified so that each game device 3 has function units G1 to G6 provided at center server device 1. In this case, function units G1 to G6 can be deleted from center server device 1. This modification can be applied to various embodiments according to Modification 6.

D-10: Modification 10

In the above embodiment, a player ID obtained by player ID obtainer F7 is stored in storage device 35, but it may be configured so as not to be stored in storage device 35. For example, by employing a type of a card reader holding an IC card inserted as card ID receiver 33, at the time when a player ID is needed, controller 30 inquires card ID receiver 33 to obtain a card ID, and inquires of center server device 1 a player ID associated with the obtained card ID. In a case in which a type of card reader not holding an IC card (for example, a type through which an IC card is passed over, i.e., contactless type) is employed as card ID receiver 33, or in a case in which a type of receiver is employed for making a player enter identification information without using an IC card, a player ID obtained by player ID obtainer F7 needs to be stored in storage device 35 in the same way as in the above-described embodiment.

D-11: Modification 11

In the above embodiment, when the first predetermined game result is obtained at a game device at which a player plays, the game device and center server device 1 work in cooperation with each other to update the play history of the player in storage device 15. Benefit information items corresponding to all location information items that agree with the player ID corresponding to the play history are then updated, and the benefit information items after being updated are obtained by a game device at which a player having a player ID corresponding to the location information plays.

A means for realizing this operation can be freely selected. For example, in a case in which the first predetermined game result is obtained at a given game device, the game device may notify center server device 1 of that effect, or center server device 1 may voluntarily confirm with each game device whether the first predetermined game result is obtained. The same applies to the second predetermined game result. The voluntary confirmation is, for example, realized by transmitting a request at predetermined time intervals from a device that makes a confirmation to a device to which a confirmation is made.

Also, for example, when benefit information corresponding to a given location information item is updated, center server device 1 may notify a game device at which a player having a player ID corresponding to the location information plays of that effect. Alternatively, each game device may voluntarily confirm whether benefit information corresponding to a player ID of a player who plays at the game device is updated with center server device 1.

D-12: Modification 12

In the above embodiment, common device 5 and management device 4 are separate entities. However, they may be integrated. That is, common device 5 may be provided with the functions of management device 4. In an alternative, management device 4 may be removed, so that each of all game devices can directly communicate with center server device 1. Also, center server device 1 may be removed, so that each of all management devices 4 substitutes center server device 1. In this case, each of all management devices 4 may be provided with a storage device equivalent to storage device 15, and the storage devices may be caused to synchronize among management devices 4. Also, because each of all game devices 3 is provided with a storage device equivalent to storage device 15, the storage devices may be caused to synchronize among plural game devices 3. In this case, in a case in which game device 3 is provided with attribute information obtainer F1, a storage device from which attribute information is obtained by attribute information obtainer F1 of each game device 3 is the storage device of the game device 3. It is to be noted that instead of making the storage devices synchronized, information items stored in the storage devices may be dispersed among plural management devices 4 or plural game devices 3. In this case, the function units of game device 3 will give and receive information to and from all devices provided with the dispersed storage devices.

D-13: Modification 13

In the above embodiment, offering unit F4 of game device 3A at which player A plays is allowed to offer the engagement of friendship to player B only in a case in which location information corresponding to the player ID of player B is that which identifies game device 3A. However, it may be configured so that offering unit F4 is allowed to offer the engagement of friendship to player B only in a case in which location information corresponding to the player ID of player A is that which identifies game device 3B.

DESCRIPTION OF REFERENCE NUMERALS

1 . . . center server device, 2 . . . game housing, 3 . . . game device, 4 . . . management device, 5 . . . common device, 10,30 . . . controller, 14,34 . . . communication unit, 15, 35 . . . storage device, 31 . . . display unit, 32 . . . operation unit, 33 . . . receiver, 34 . . . communication unit, 36 . . . medal mechanism, 100 . . . game system, F1 . . . attribute information obtainer, F2 . . . transmitter, F3 . . . receiver, F4 . . . offering unit, F5 . . . accepting unit, F7 . . . player ID obtainer, F8 . . . game controller, F9 . . . credit manager, G1 . . . attribute information extractor, G2 . . . movement controller, G3 . . . grant unit, G4 . . . offering processing unit, G5 . . . acceptance processing unit, G6 . . . attribute information changer, PA,PB,PC . . . pet.

The invention claimed is:

1. A game system comprising:
plural game devices, each game device allowing a player to play a game; and
a server device having a communication unit for communicating with each of the plural game devices, the server device comprising:
a storage device that centrally stores, in association with player identification information uniquely identifying a player, a piece of location information, among plurality of pieces of location information, identifying a respective game device at which a character of the player is located, among the plural game devices, each of the plurality of pieces of location information corresponding to one of the plural game devices, and the storage device additionally storing a piece of attribute information of the character in association with the player identification information;
a responder that, upon receiving a request from any one of the plural game devices, extracts, from the storage device, the piece of attribute information that corresponds to the piece of location information identifying the requesting game device, and returns a response containing the extracted piece of attribute information to the game device, the piece of the location information identifying the requesting game device being contained in the request; and
a movement controller that controls the location information,
wherein,
each of the plural game devices comprising:
an identification information obtainer that obtains player identification information of a player, among a plurality of players;
an attribute information obtainer that transmits, to the server device, a request for providing attribute information on a character of any of the players of the plural game devices which the game device should display; and
a game controller that causes the game device to display a character of a player based on attribute information contained in the response from the server device, and
wherein, when the movement controller has changed a first piece of location information, from among the plurality of pieces of location information, stored in association with player identification information of a first player who plays at a first game device among the plural game device to a second piece of location information which identifies a second game device at which a second player plays,
(i) the attribute information obtainer of the first game device does not obtain attribute information on a character of the first player, and as a result the game controller of the first game device controls the first game device not to display a character of the first player, and (ii) the attribute information obtainer of the second game device obtains the attribute information on the character of the first player, and as a result the game controller of the second game device controls the second game device to display the character of the first player based on the attribute information on the character of the first player contained in a response from the server device, the second game device differing from the first game device, such that the character of the first player moves from the first game device immediately to the second game device.

2. A game system according to claim 1, wherein, in a case in which location information stored in association with the player identification information of the first player is that which identifies the second game device and in which a predetermined game result is obtained as a result of the game controlled by the second game device, the first game device grants a predetermined benefit to the first player.

3. A game system according to claim 2,
wherein,
each of the plural game devices further comprising:
a transmitter that transmits a message to another game device; and
a receiver that receives a message from another game device, and
wherein the first game device transmits a message to the second game device in a case in which the predetermined benefit is granted to the first player.

4. A game system according to claim 1, wherein, in a case in which the movement controller has changed, from among the pieces of the location information stored in the stored device, the piece of location information stored in association with the player identification information of the first player from that which identifies the second game device to that which identifies the first game device, the second game device does not display the character of the first player and the first game device displays the character of the first player.

5. A game system according to claim 4,
wherein
each of the plural game devices further comprising:
an offering unit for offering the second player the engagement of a predetermined relationship with the first player; and
an accepting unit for accepting an offer, from the second player, for the engagement of the predetermined relationship with the first player,
wherein the offering unit allows the offering for the engagement of the predetermined relationship from the first player to the second player only in a case in which location information stored in association with the player identification information of the second player is that which identifies the first game device, or in a case in which location information stored in association with the player identification information of the first player is that which identifies the second game device,
wherein the accepting unit allows the first player to accept the offer for the engagement of the predetermined relationship from the second player only after the first player is offered the engagement of the predetermined relationship from the second player, and
wherein the predetermined relationship of which the engagement is offered to the first player from the second player is engaged only in a case in which the accepting unit accepts the engagement of the predetermined relationship.

6. A game system according to claim 5, wherein, in a case in which the first player and the second player have engaged in the predetermined relationship and in which a second predetermined game result is obtained as a result of the game controlled by the first game device, location information stored in association with player identification information of the second player is changed to that which identifies the first game device in the storage device.

7. A game system according to claim 5,
wherein the storage device stores, in association with the player identification information, attribute information indicating an attribute of the character of the player,
wherein each of the plural game devices further comprises an attribute information obtainer that obtains, from the storage device, attribute information corresponding to location information identifying the game device itself in the storage device, and
wherein the game controller causes the game device to display the character based on attribute information obtained by the attribute information obtainer.

8. A game system according to claim 7, wherein in the storage device, attribute information of the character of the first player is changed based on a result of the game the first player played, based on a result of the game a player who has engaged in the predetermined relationship with the first player played, or based on the number of players who have engaged in the predetermined relationship with the first player.

9. A game system according to claim 1, wherein each of the plural game devices further comprising:
an offering unit for offering the second player the engagement of a predetermined relationship with the first player;
wherein the offering unit allows the offering for an engagement of the predetermined relationship from the first player to the second player only in a case in which location information stored in association with the player identification information of the second player is that which identifies the first game device, or in a case in which location information stored in association with the player identification information of the first player is that which identifies the second game device.

10. A game system according to claim 1, wherein each of the plural game devices further comprising:
an accepting unit for accepting an offer, from the second player, for the engagement of the predetermined relationship with the first player,
wherein the accepting unit allows the first player to accept an offer for an engagement of the predetermined relationship from the second player only after the first player is offered the engagement of the predetermined relationship from the second player,
wherein the engagement is offered to the first player from the second player only in a case in which location information stored in association with the player identification information of the second player is that which identifies the first game device, or in a case in which location information stored in association with the player identification information of the first player is that which identifies the second game device.

11. A game system according to claim 1, wherein the request transmitted by the attribute information obtainer to the server device includes the player identification information obtained by the identification information obtainer, with the player identification information serving as the piece of location information identifying the game device.

* * * * *